United States Patent [19]

Mitoh et al.

[11] Patent Number: 6,078,472
[45] Date of Patent: Jun. 20, 2000

[54] SUSPENSION FOR HEAD ASSEMBLY

[75] Inventors: Kojiro Mitoh; Takuya Amemiya, both of Nagano, Japan

[73] Assignee: Fujitsu Limited, Kawasaki, Japan

[21] Appl. No.: 09/067,190

[22] Filed: Apr. 27, 1998

[30] Foreign Application Priority Data

Nov. 19, 1997 [JP] Japan .................................. 9-318520

[51] Int. Cl.7 .................................................... G11B 5/48
[52] U.S. Cl. ............................................................ 360/104
[58] Field of Search .................................. 360/103, 104, 360/108

[56] References Cited

U.S. PATENT DOCUMENTS

| | | | |
|---|---|---|---|
| 5,774,305 | 6/1998 | Boutaghou | 360/104 |
| 5,864,445 | 1/1999 | Bennin et al. | 360/104 |
| 5,870,258 | 2/1999 | Khan et al. | 360/104 |
| 5,875,071 | 2/1999 | Erpelding et al. | 360/104 |
| 5,880,908 | 3/1999 | Shiraishi et al. | 360/104 |

FOREIGN PATENT DOCUMENTS

| | | |
|---|---|---|
| 599669A2 | 6/1994 | European Pat. Off. . |
| 6215513 | 8/1994 | Japan . |

*Primary Examiner*—Craig A. Renner
*Assistant Examiner*—Angel Castro
*Attorney, Agent, or Firm*—Greer, Burns & Crain, Ltd.

[57] ABSTRACT

A suspension for the head assembly includes a mount section formed in a gimbal section, and a head slider adhered on the mount section with an adhesive. Cable patterns are formed on a base member of the gimbal section, and electrically insulated from the base member. One end of each pattern is located in the mount section and capable of connecting with a head slider. A pad is projected from a surface of an adhering area of the mount section in which the head slider is adhered. The pad is electrically connected with the base member of the mount section.

10 Claims, 3 Drawing Sheets

SUSPENSION FOR HEAD ASSEMBLY

BACKGROUND OF THE INVENTION

The present invention relates to a suspension of a head assembly, a head assembly having the suspension and a method of manufacturing the suspension.

A conventional magnetic disk drive unit, which has been disclosed in Japanese Patent Kokai Gazette No. 6-215513, is shown in FIG. 8. In the disk drive unit 100, a magnetic disk 104 and an actuator 106 for positioning a magnetic head are assembled in an enclosure 102. A base end section of a head assembly 112 is held by an arm 108, which is driven by the actuator 106. The head assembly 112 includes: a suspension 110, which is made of a thin metal plate; and a head slider 10 (see FIG. 9), which is attached to a front end section of the suspension 110.

The suspension 110 and the head slider 10 are shown in FIG. 9 (enlarged view). The suspension 110 includes: a suspension proper 110a whose base end section is attached to the arm 108; and a gimbal section 110b, which is provided to a front end section of the suspension proper 110a. The gimbal section 110b has a U-shaped slit hole 114. A mount section 116, on which the head slider 10 will be mounted, is formed in the slit hole 114. The head slider 10 is adhered on the mount section 116 with an adhesive. Terminals 118 will be connected with electrodes of the head slider 10 by gold balls.

Cable patterns 120 are formed on a surface of the suspension 110, but they are electrically insulated from a base member (a base material) of the suspension 110. The suspension 110 on which the cable patterns 120 are formed is called "CAPS (Cable Patterned Suspension)".

Recently, memory capacity of magnetic disks are becoming greater, and memory density thereof is becoming higher. Thus, smaller magnetic heads have been required. Countermeasures to static electricity have been taken so as to protect semiconductor elements. Since the smaller magnetic heads are employed, further countermeasures to the static electricity are required now.

When a magnetic disk is rotated and rubbed with a magnetic head while conveying a magnetic disk drive unit, the static electricity is generated in the magnetic head. When magnetic heads, which are conveyed as parts of magnetic disk drive units, are rubbed with each other, the static electricity is generated in the magnetic heads, too.

As described above, the head slider 10 is adhered on the mount section 116 with the adhesive. To prevent deformation of the head slider 10, a non-electro-conductive adhesive having small Young's modulus is employed as the adhesive. A conventional countermeasure to the static electricity in the magnetic head includes: adhering the head slider 10 on a mount section 116 with the non-electro-conductive adhesive; electrically connecting the head slider 10 with the suspension 110 with an electro-conductive adhesive; and discharging the static electricity to the suspension 110. The adhesive strength of the electro-conductive adhesive is less than that of the non-electro-conductive adhesive, but the head slider 10 is required to be securely and reliably adhered on the suspension 110 with the non-electro-conductive adhesive having greater adhesive strength, so that the electro-conductive adhesive and the non-electro-conductive adhesive are used.

FIG. 10 is a sectional view of the cable patterns 120 formed on the surface of the suspension 110. The cable patterns 120 are electrically insulated from the base member of the suspension by an insulating layer 130. And surfaces of the cable patterns 120 are protected by another insulating layer 132.

A surface of the mount section 116 is coated with an insulating layer as in as the structure shown in FIG. 10. On the other hand, a metal surface is exposed in an adhering area of the mount section 116, in which the head slider 10 will be adhered, so the head slider 10 and the suspension 110 can be electrically connected by applying the electro-conductive adhesive between the metal surface and the head slider 10.

In the conventional disk drive unit, the head slider 10 must be attached to the mount section 116 by the troublesome two steps of: adhering the head slider 10 on the mount section 116 with the non-electro-conductive adhesive; and applying the adhesive.

SUMMARY OF THE INVENTION

An object of the present invention is to provide a suspension for a head assembly, which is capable of having a secure countermeasure to the static electricity and being easily manufactured.

Another object of the present invention is to provide a head assembly employing said suspension.

And another object of the present invention is to provide a method of manufacturing said suspension.

To achieve the objects, the present invention has following constitutions.

The suspension for the head assembly of the present invention comprises: a gimbal section; a mount section being formed in the gimbal section, wherein a head slider will be adhered on the mount section with an adhesive; cable patterns being formed on a base member of the gimbal section, the cable patterns being electrically insulated from the base member, wherein one end of each cable pattern is located in the mount section and capable of connecting with the head slider; and a pad being projected from a surface of an adhering area of the mount section in which the head slider will be adhered, the pad being electrically connected with the base member of the mount section.

Preferably the pad includes a part of a thin metal layer, which is formed to form the cable patterns. With this composition, the cable patterns and the pad can be simultaneously formed.

Preferably the pad is formed by: forming an island section, which is projected on the surface of the base member of the mount section like an island; and forming the thin metal layers on a surface of the island section. With this constitution, the head slider and the mount section can be securely electrically connected to each other.

Preferably a group of pads are formed, and concave sections are formed between adjacent pads. With this composition, the head slider can be tightly adhered on the mount section with the adhesive.

Preferably the suspension further comprises a dam section being formed in the mount section and being capable of preventing the adhesive from flowing over terminals of the cable patterns. With this constitution, the head slider and the terminals can be securely electrically connected to each other.

Another suspension of the present invention comprises: a gimbal section; a mount section being formed in the gimbal section, wherein a head slider will be adhered on the mount section with an adhesive; cable patterns being formed on a base member of the gimbal section, the cable patterns being electrically insulated from the base member, wherein one end of each cable pattern is located in the mount section and capable of connecting with the head slider; and an insulating layer covering over a surface of the mount section, wherein an exposing hole, in which a base material of the mourn section is exposed, is formed in an adhering area of the mount section in which the head slider will be adhered.

The head assembly of the present invention comprises: a gimbal section; a mount section being formed in the gimbal section; a head slider being adhered on the mount section with an adhesive; cable patterns being formed on a base member of the gimbal section, the cable patterns being electrically insulated from the base member, wherein one end of each cable pattern is located in the mount section and connected with the head slider; and a pad being projected from a surface of an adhering area of the mount section in which the head slider is adhered, wherein the head slider is electrically connected with the mount section through the pad.

Preferably the head slider is adhered on the mount section with an electro-conductive adhesive, or the head slider is adhered on the mount section, with a non-electro-conductive adhesive, so as to come into contact with the pad. With this composition, the head slider and the mount section can be securely electrically connected to each other.

Preferably the head assembly further comprises a dam section being formed in the mount section and being capable of preventing the adhesive from flowing over terminals of the cable patterns, wherein the head slider is electrically connected with the mount section through an electro-conductive adhesive.

The method of manufacturing the suspension of the head assembly, which includes: a mount section on which a head slider will be adhered with an adhesive and in which one end of each cable pattern, which is electrically insulated from a base member of the mount section, is located; and a pad being projected from a surface of the mount section, the pad being electrically connected with the base member, comprising the steps of: forming a first insulating layer on a base member of the suspension; forming an island section, which is formed like an island and which is located at a position corresponding to the pad, in the mount section by reshaping the first insulating layer; forming a metal layer on a surface of the suspension including the mount section; reshaping the metal layer so as to form cable patterns on the first insulating layer and leave the metal layer on an upper face and a side face of the island section to electrically connect with the mount section; forming a second insulating layer on the surface of the suspension including the mount section; and removing a part of the second insulating layer to expose the metal layer of the island section as the pad.

Preferably a dam section, which is capable of preventing the adhesive (for adhering the head slider on the mount section) from flowing over terminals of the cable patterns, is formed in the step of forming the metal layer, and a part of the second insulating layer covering over the dam section is removed in the step of removing the second insulating layer to expose the metal layer of the dam section. With this composition, the suspension having the dam section can be easily manufactured.

In the present invention, the head slider and the suspension can be electrically connected to each other by only adhering the head slider. Therefore, the head assembly including the secure countermeasure to the static electricity can be easily assembled by only one step: the adhesion step. By reducing the manufacturing step, manufacturing cost of the head assembly can be reduced.

In the head assembly of the present invention, the head slider and the mount section of the suspension are securely electrically connected, and the countermeasure to the static electricity is securely taken, so the reliability of the head assembly can be increased.

In the method of manufacturing the suspension of the present invention, the pad can be easily formed in the mount section by the conventional manner of forming the cable patterns. Proper countermeasure against the static electricity can be taken. And the head assembly can be easily assembled.

BRIEF DESCRIPTION OF THE DRAWINGS

Preferred embodiments of the present invention will now be described by way of examples and with reference to the accompanying drawings, in which.

DETAILED DESCRIPTION OF THE PREFERRED EMBODIMENTS

The suspension and the head assembly of the embodiments of the present invention will now be described in detail with reference to the accompanying drawings.

Figure 1:
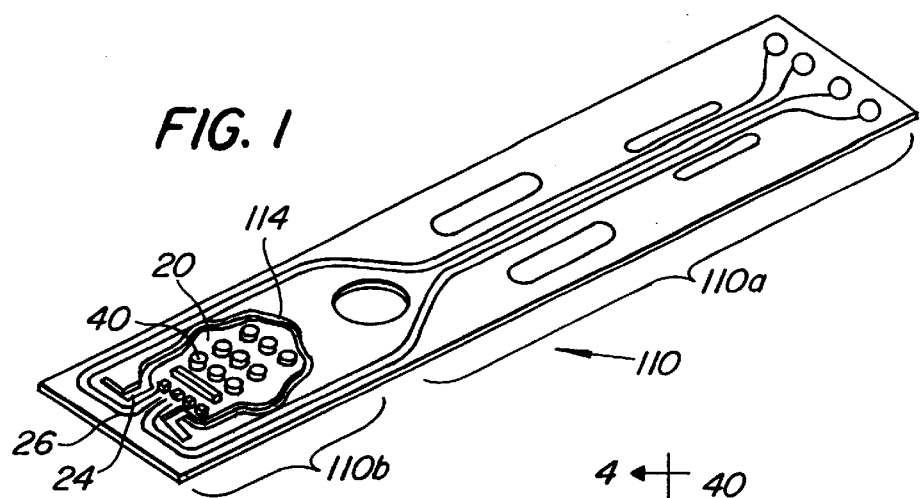
FIG. 1 is a perspective view of a suspension for a head assembly of an embodiment.

FIG. 1 shows a whole appearance of the suspension 110 of the present embodiment. The basic structure of the suspension 110 is almost the same as that of the conventional suspension. Namely, the suspension 110 includes: a suspension proper 110a, which is made of a thin metal plate; and a gimbal section 10b. The gimbal section 110b has a slit hole 114, which is formed to enclose a mount section 20, on which a head slider will be mounted. In the present embodiment, the suspension 110 is made of a thin stainless steel. Width of the suspension 110 is about 2 mm; length thereof is about 9 mm; thickness thereof is about 25 µm.

Figure 2:
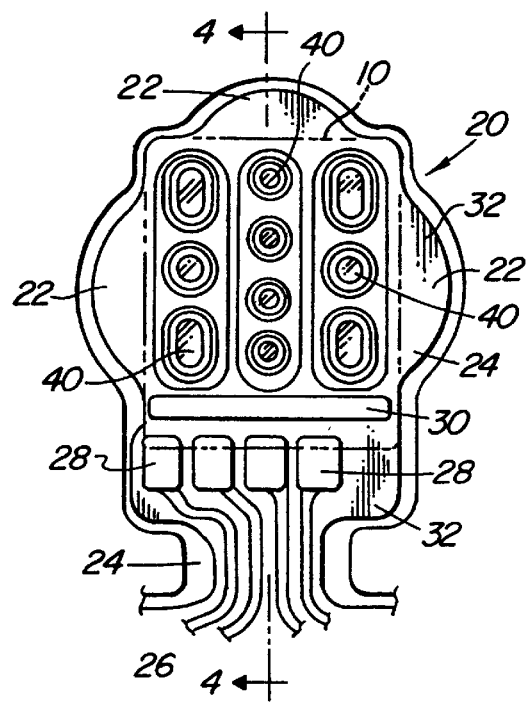
FIG. 2 is a plan view of a head slider.

The structure of the mount section 20 of the gimbal section 110b is a characteristic point of the suspension 110. An enlarged plan view of the mount section 20 is shown in FIG. 2. Expanded sections 22 are outwardly expanded from edges of the mount section 20. The mount section 20 is provided to a free end of a beam section 24; the beam section 24 supports the mount section 20 like an arm.

Cable patterns 26 are extended from the mount section 20 to the suspension 110 via the beam section 24. Terminals 28 are respectively provided to ends of the cable patterns 26. In the present embodiment, four terminals 28 are linearly arranged in a base part of the mount section 20. Number and clearance of the terminals 28 are equal to those of terminals of the head slider 10.

A dam section 30 prevents an adhesive, which adheres the head slider 10 on the mount section 20, from flowing over the terminals 28. The dam section 30 is provided close to the terminals 28, upwardly projected and extended in the transverse direction of the mount section 20.

The cable patterns 26, the terminals 28 and the dam section 30 are formed by thin copper layers. An insulating layer 32 covers over and protects the cable patterns 26. The insulating layer 32 covers over the surface of the mount section 20 other than exposed parts, e.g., the terminals 28, the dam section 30. Note that, a narrow non-covered part, which is not covered with the insulating layer 32, is formed and exposed along an outer edge of the mount section 20.

In the mount section 20 of the present embodiment, a plurality of pads 40, which are projected from a surface of an adhering area in which the head slider 10 will be adhered, is a characteristic point. The pads 40 are electrically connected with a base member of the mount section 20 by the copper layer, which will be formed into the cable patterns 26, the terminals 28, etc. In the present embodiment, 12 pads 40 are matrically provided. Concave sections are formed between the adjacent pads 40. The concave sections are filled with the adhesive when the head slider 10 is adhered on the mount section 20. By filling the adhesive in the concave sections, the head slider 10 can be tightly adhered or fixed.

Figure 3:
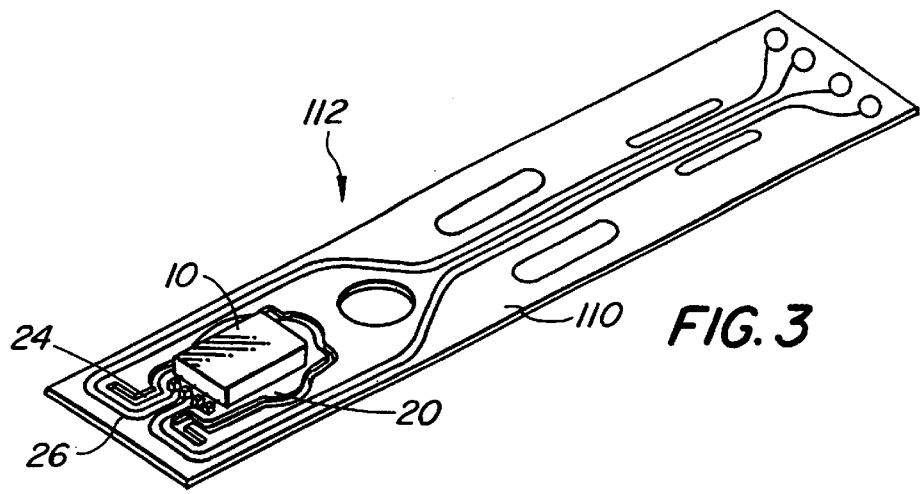
FIG. 3 is a perspective view of the head assembly.

A whole appearance of a head assembly 112, in which the head slider 10 is adhered on the mount section 20 of the suspension 110, is shown in FIG. 3. The head slider 10 has been located and adhered at prescribed position on the mount section 20.

In the present embodiment, length of the head slider 10 is about 1.0 mm; width thereof is about 0.8 mm; thickness thereof is about 0.3 mm.

Figure 4:
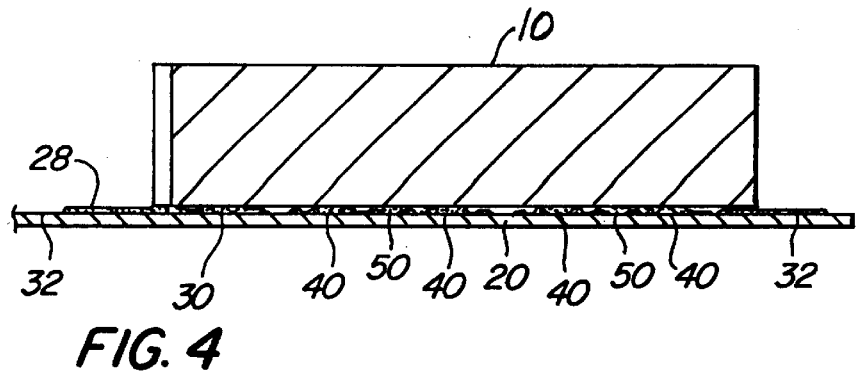
FIG. 4 is a sectional view in which the head slider is adhered on a mount section.

FIG. 4 is a sectional view taken along the line 4—4 in FIG. 2, in which the head slider 10 is adhered on the mount section 20. The pads 40 and the dam section 30 are slightly projected outwards from the surface of the mount section 20. The height of the pads 40 is equal to that of the dam section 30. The head slider 10 is mounted on and parallel to the surface of the mount section 20.

Figure 5:
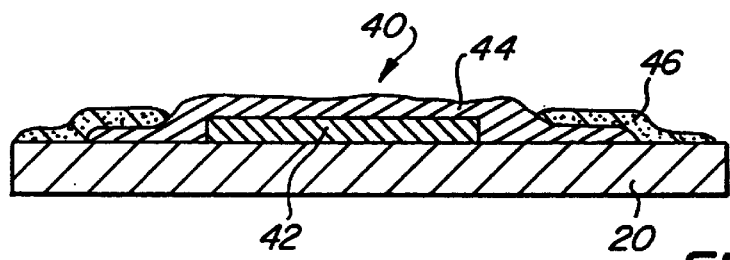
FIG. 5 is an enlarged sectional view of a pad of the mount section.

FIG. 5 is an enlarged sectional view of the pad 40. The pad 40 is formed by the steps of: forming a lower insulating layer 42; forming a copper layer 44 over the lower insulating layer 42 to project upwardly; and forming an upper insulating layer 46, which enclose the copper layer 44. The lower insulating layer 42 or an island section is projected on the surface of the base member of the mount section 20 like an island. Planar shapes of the lower insulating layers 42 corresponds to those of the pads 40, e.g., circle, ellipse. Around the lower insulating layer 42, the copper layer 44 of the pad 40 is electrically connected with the mount section 20.

In the present embodiment, an electro-conductive adhesive 50 is used as the adhesive for adhering the head slider 10. By employing the electro-conductive adhesive 50, the head slider 10 can be securely electrically connected with the mount section 20 via the pads 40 when the head slider 10 is adhered on the mount section 20. Since the pads 40 are electrically connected with the mount section 20 via the copper layer 40, the head slider 10 can be mounted on and electrically connected with the mount section 20, which is made of an electro-conductive material, by adhering the head slider 10 on the mount section 20 with the electro-conductive adhesive 50.

Note that, the copper layer is exposed in an upper face of the dam section 30, but the dam section 30 is not electrically connected with the mount section 20. The dam section 30 prevents the electro-conductive adhesive 50 from flowing over the terminals 28 when the head slider 10 is adhered with the electro-conductive adhesive 50.

In the suspension 110 of the present embodiment, as described above, the head assembly including the countermeasure to the static electricity can be easily assembled by only one manufacturing step: adhering the head slider 10 on the mount section 20 with the electro-conductive adhesive 50. With this advantage, manufacturing cost of the head assembly can be reduced.

Since the suspension 110 of the present embodiment has the projected pads 40 which are located in the mount section 20, adhesive area in which the electro-conductive adhesive 50 is applied can be broader. By the broader adhesive area, the head slider 10 can be securely adhered or fixed on the mount section 20 with the electro-conductive adhesive 50 whose adhesive strength is not so great.

A method of manufacturing the suspension 110, in which the pads 40 are formed in the mount section 20, will be explained.

First, an insulating layer (a first insulating layer) is formed on the surface of the base member of the mount section 20. Then, the lower insulating layers 42 (the island sections) are formed like island at positions, at which the pads 40 are formed, by reshaping the first insulating layer. For example, the first insulating layer may be made from photosensitive polyimide; the lower insulating layers 42 may be formed like islands, in the reshaping step, by photo-lythography technique.

By forming the lower insulating layers 42, the surface of the mount section 20 other than the lower insulating layers 42 is exposed. However, the first insulating layer partially exists at the positions in the mount section 20, at which the terminals 28 and the dam section 30 will be formed, and at the positions in the suspension 110, at which the cable patterns 26 will be formed.

Next, a metal layer, e.g., a thin copper layer, is formed on the whole surface of the mount section 20 by spattering, plating, etc. By forming the copper layer, the upper faces and the side faces of the lower insulating layers 42, the surface of the mount section 20 and the whole surface of the suspension 110 are covered with the copper layer.

Next, the copper layer is reshaped to partially leave the copper layers 44 in the pads 40 (see FIG. 5) by the photo-lythography technique. Note that, the cable patterns 26, the terminals 28 and the dam section 30 are simultaneously formed in this reshaping step by the same technique.

The copper layers 44, the cable patterns 26, etc. are formed by the following steps.

First, photo-resist is painted on the whole surface of the thin copper layer. A resist pattern, which will cover the parts of the suspension 110 in which the pads 40, the cable patterns 26, the terminals 28 and the dam section 30 will be formed, is fitted on the photo-resist layer. The resist pattern partially exposes the photo-resist corresponding to the pads 40, the cable patterns 26, etc. in the light, so that the photo-resist in the exposed parts are melted and removed.

Next, the copper layers in the exposed parts, in which the photo-resist layers have been removed, are removed in a proper way, e.g., chemical etching, ion trimming. Then, the photo-resist on the copper layer is removed, so that the copper patterns corresponding to the pads 40, the cable patterns 26, the terminals 28 and the dam section 30 are formed.

Next, the photosensitive polyimide is painted on the whole surface of the suspension 110, as a second insulating layer, so as to cover the cable patterns 26. The copper layers corresponding to the pads 40, the terminals 28 and the dam section 30 must be exposed, so the photosensitive polyimide layer is partially removed by the photo-lythography technique. By this step, the projected pads 40, in which the copper layers 44 are exposed in the upper faces and whose side faces are covered with the second insulating layers 46 (see FIG. 5), can be formed. Note that, the upper faces of the pads 40, the terminals 28 and the dam section 30 will be plated with gold.

In the conventional method of manufacturing the CAPSs, the cable patterns and the terminals are formed on the suspension by the same method. Namely, the conventional method also comprised the steps of: forming the first insulating layer on the suspension; forming the copper layer on the first insulating layer; reshaping the copper layer so as to form the cable patterns, etc.; and forming the second insulating layer to cover the cable patterns, etc. So, the pads 40 of the present embodiment can be formed by the conventional method without changing any steps. The conventional method can be preferably applied to manufacture the suspension of the present embodiment.

In the present embodiment, the pads 40 can be formed by employing parts of the copper layer, which has been formed to the cable patterns 26, the terminals 28, etc. on the suspension 110. In the case of forming the cable patterns 26, etc., which are formed on the suspension 110, with another metal, e.g., aluminium, the pads 40 will include such metal.

In the present embodiment, the head slider 10 is adhered on the mount section 20 with the electro-conductive adhesive 50, but non-electro-conductive adhesive, e.g., an epoxy adhesive, may be employed instead of the electro-conductive adhesive 50.

When the head slider 10 is fixed on the mount section 20, a bottom face of the slider 10 is made to come into contact with the copper layers 44 of the pads 40, so that the head slider 10 can be electrically connected with the mount section 20. In this state, the head slider 10 can be adhered on the mount section 20 with the non-electro-conductive adhesive.

In the mount section 20, the pads 40 are arranged with clearance, so concave sections are formed between the adjacent pads 40. Since the non-electro-conductive adhesive is filled in the concave sections, the head slider 10 and the mount section 20 can be adhered, without covering the contact faces between them, with the non-electro-conductive adhesive.

Figure 6:
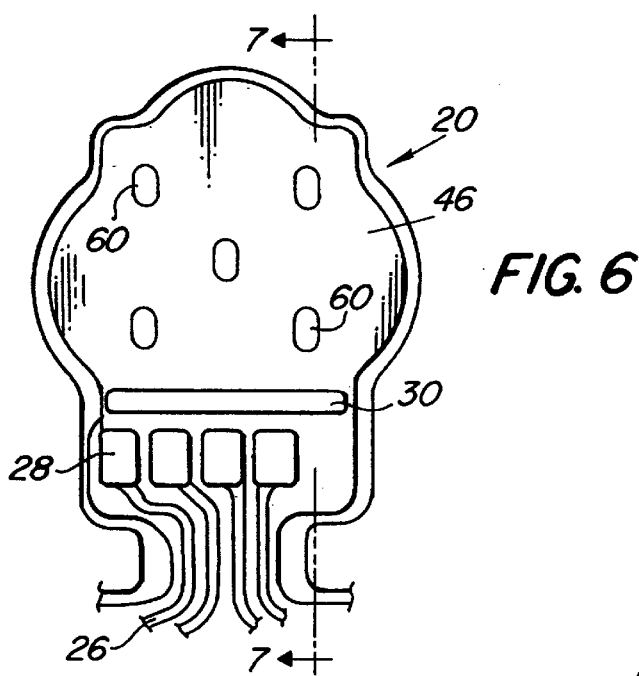
FIG. 6 is a plan view of the mount section of another embodiment.

Another embodiment of the suspension of the present invention is shown in FIG. 6, which is an enlarged plan view of the mount section 20. Elements shown in the foregoing embodiment are assigned the same symbols and explanation will be omitted.

The characteristic point of the present embodiment is exposing holes 60, which are formed in an adhering area of the mount section 20 in which the head slider 20 will be adhered. In the exposing holes 60, the insulating layer 46 is partially removed, and the base material of the mount section 20 is exposed. In the present embodiment, the head slider 10 may be adhered on the mount section with the electro-conductive adhesive.

The exposing holes 60 can be formed, during the steps of manufacturing the CAPS, by the steps of: forming the photosensitive polyimide insulating layer on the mount section 20; and partially removing the insulating layer by the photo-lythography technique. By these steps, the surface of the mount section 20 can be exposed in the exposing holes 60, whose planar shapes may be circles, ellipses, etc.

Figure 7:
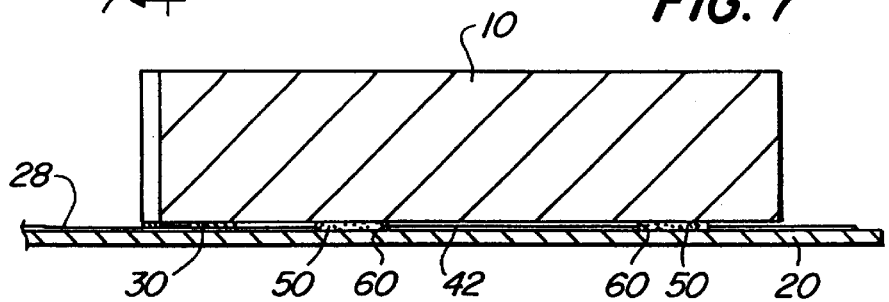
FIG. 7 is a sectional view in which the head slider is adhered on a mount section.
Figure 8:
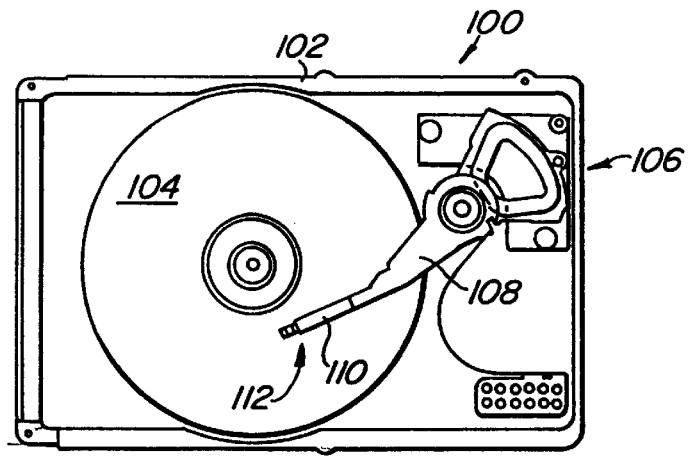
FIG. 8 is a plan view of the conventional magnetic disk drive unit.
Figure 9:
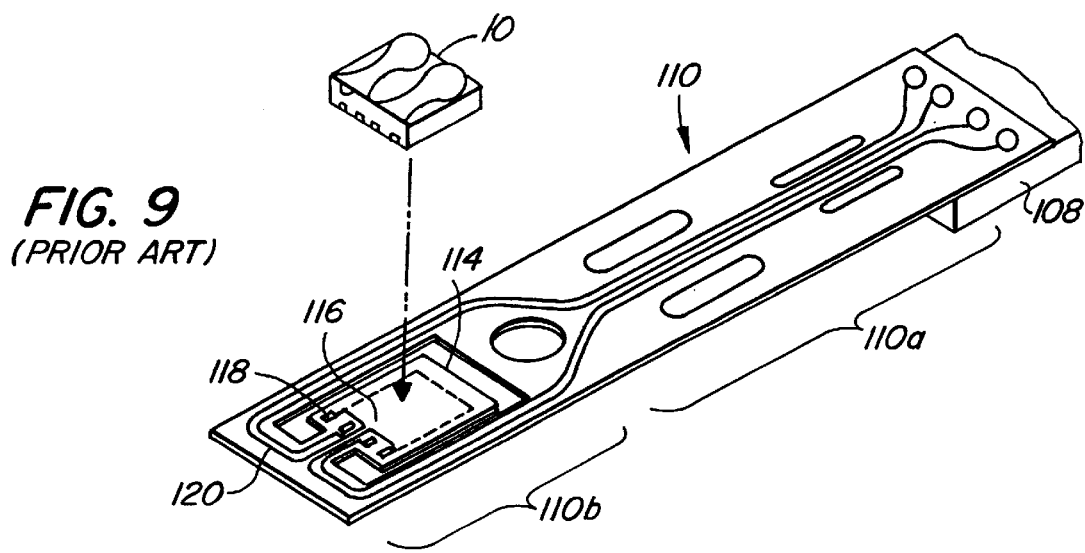
FIG. 9 is a perspective view of the conventional suspension and the slider.
Figure 10:
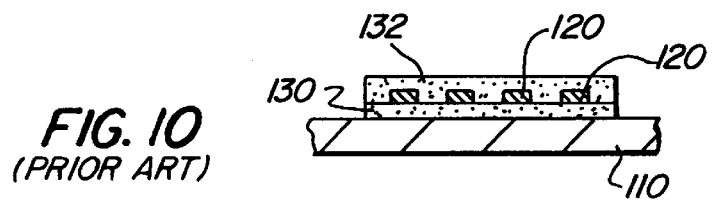
FIG. 10 is a sectional view of the cable patterns formed on the conventional suspension.

FIG. 7 is a sectional view taken along a line 7—7 in FIG. 6, in which the head slider 10 is adhered on the mount section 20 having the exposing holes 60 with the electro-conductive adhesive 50. With this structure, the head slider 10 can be adhered on and electrically connected with the mount section 20.

In the present embodiment too, the exposing holes 60 can be formed by the conventional method for forming the cable patterns, the terminals 28, etc. And the head assembly including the proper countermeasure against the static electricity can be easily assembled with only one step: adhering the head slider 10 on the mount section 20 with the electro-conductive adhesive 50. With this structure, the manufacturing step can be reduced; the manufacturing cost of the head assembly can be reduced.

Note that, the head assembly for the magnet disk drive unit has been described in the above described embodiments, but the head assembly of the present invention may be employed to an optical head assembly. Namely, the present invention is not limited to the head assembly for the magnet disk drive units.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A suspension for a head assembly, comprising:
    a gimbal section;
    a mount section formed in said gimbal section, wherein a head slider is adhered on said mount section with an adhesive;
    cable patterns formed on an insulating layer provided over said gimbal section, so that said cable patterns is electrically insulated from said gimbal section, wherein one end of each said cable pattern is located in said mount section and capable of connecting with said head slider; and
    a pad projecting from a surface of an adhering area of said mount section in which said head slider is adhered, said pad including a metal layer formed over an island section of said insulating layer, said metal layer being electrically connected to said mount section.

2. The suspension according to claim 1, wherein said metal layer formed over said island section is formed from a thin metal layer provided to form said cable patterns.

3. The suspension according to claim 1,
    wherein a plurality of pads are formed, and concave sections are formed between adjacent pads.

4. The suspension according to claim 1,
    further comprising a dam section being formed in said mount section, said dam section being capable of preventing the adhesive from flowing over terminals of said cable patterns.

5. A head assembly, comprising:
    a gimbal section;
    a mount section formed in said gimbal section;
    a head slider adhered on said mount section with an adhesive;

cable patterns formed on an insulating layer provided over a base member of said gimbal section, so that said cable patterns are electrically insulated from the base member, wherein one end of each said cable pattern is located in said mount section and connected with said head slider; and at least one pad projecting from a surface of an adhering area of said mount section in which said head slider is adhered, said pad including a metal layer formed over an insulating island section of said insulating layer, whereby said head slider is electrically connected with said mount section through said metal layer.

6. The head assembly according to claim 5, wherein said head slider is adhered on said mount section with an electro-conductive adhesive.

7. The head assembly according to claim 5, wherein said head slider is adhered on said mount section, with a non-electro-conductive adhesive, so as to contact said pad.

8. The head assembly according to claim 5, further comprising a dam section being formed in said mount section, said dam section being capable of preventing the adhesive from flowing over terminals of said cable patterns, wherein said head slider is electrically connected with said mount section through an electro-conductive adhesive.

9. A method of manufacturing a suspension for a head assembly, which includes: a mount section on which a head slider is adhered with an adhesive and in which one end of each cable pattern, which is electrically insulated from a base member of said mount section, is located; and at least one pad being projected from a surface of said mount section, and pad being electrically connected with said base member, comprising the steps of:

forming a first insulating layer on a base member of said suspension;

forming at least one island section at at least one position corresponding to said pad, in said mount section by reshaping said first insulating layer;

forming a metal layer on a surface of said suspension including said mount section;

reshaping said metal layer so as to form cable patterns on said first insulating layer and leave said metal layer on an upper face and a side face of said island section to electrically connect with said mount section;

forming a second insulating layer on the surface of said suspension including said mount section; and removing a part of said second insulating layer to expose said metal layer of said island section as said pad.

10. The method according to claim 9, wherein a dam section, which is capable of preventing the adhesive for adhering said head slider on said mount section from flowing over terminals of said cable patterns, is formed in the step of forming said metal layer, and wherein a part of said second insulating layer covering over said dam section is removed in the step of removing said second insulating layer to expose said metal layer of said dam section.

* * * * *

UNITED STATES PATENT AND TRADEMARK OFFICE
CERTIFICATE OF CORRECTION

PATENT NO. : 6,078,472
DATED : June 20, 2000
INVENTOR(S) : Mitoh et al.

It is certified that error appears in the above-identified patent and that said Letters Patent is hereby corrected as shown below:

On the Title Page:

Under "[56] References Cited U.S. PATENT DOCUMENTS", please insert the following references:

| | | | |
|---|---|---|---|
| 4,761,699 | 8/1988 | Ainslie et al. | 360/103 |
| 5,597,496 | 1/1997 | Masaichi et al. | 360/104 |
| 5,645,735 | 7/1997 | Bennin et al. | 216/22 |
| 5,657,186 | 8/1997 | Kudo et al. | 216/94 |
| 5,696,651 | 12/1997 | Endo et al. | 360/104 |
| 5,864,446 | 1/1999 | Enod et al. | 360/104 |

Under "[56] References Cited FOREIGN PATENT DOCUMENTS", please insert the following references:

| | | |
|---|---|---|
| 2295918 | 6/1998 | United Kingdom |
| 7244826 | 9/1995 | Japan |

UNITED STATES PATENT AND TRADEMARK OFFICE
CERTIFICATE OF CORRECTION

PATENT NO. : 6,078,472
DATED : June 20, 2000
INVENTOR(S) : Mitoh et al.

It is certified that error appears in the above-identified patent and that said Letters Patent is hereby corrected as shown below:

Under "[57] ABSTRACT", line 6, after "each", please insert --cable--therefor

In the Specification:

Column 1,
Line 53, please delete "on a" and insert --on the-- therefor
Line 54, please delete "with the" and insert --with a-- therefor Column 2,
Line 5, please delete "as in as" and insert --as in— therefor
Line 16, before "adhesive", please insert --electroconductive-- therefor In the Claims:

Column 8,
Line 41, please delete "is" and insert --are-- therefor

Column 10,
Line 6, please delete "at at" and insert --at--therefor

Signed and Sealed this

Nineteenth Day of June, 2001

*Attest:*

*Attesting Officer*

NICHOLAS P. GODICI
*Acting Director of the United States Patent and Trademark Office*